(12) United States Patent
Kostenick, Jr. et al.

(10) Patent No.: US 7,159,440 B2
(45) Date of Patent: Jan. 9, 2007

(54) TOOL EVALUATION CALIBRATOR AND METHOD

(75) Inventors: Paul G. Kostenick, Jr., Everett, WA (US); Arlen R. Pumphrey, Lynnwood, WA (US)

(73) Assignee: The Boeing Company, Chicago, IL (US)

( * ) Notice: Subject to any disclaimer, the term of this patent is extended or adjusted under 35 U.S.C. 154(b) by 80 days.

(21) Appl. No.: 10/603,817

(22) Filed: Jun. 26, 2003

(65) Prior Publication Data

US 2004/0261491 A1 Dec. 30, 2004

(51) Int. Cl.
*G01L 25/00* (2006.01)

(52) U.S. Cl. ........................................................ 73/1.15

(58) Field of Classification Search ................. 73/1.15, 73/1.12, 1.11, 1.08
See application file for complete search history.

(56) References Cited

U.S. PATENT DOCUMENTS

| | | | |
|---|---|---|---|
| 3,827,293 A | 8/1974 | Hohberger | ................ 73/133 R |
| 4,640,117 A | 2/1987 | Anderson et al. | ............. 72/410 |
| 4,838,085 A * | 6/1989 | Pellerin et al. | ................ 73/597 |
| 4,899,594 A * | 2/1990 | Wolfer et al. | ............. 73/862.06 |
| 4,967,127 A | 10/1990 | Ishiguro et al. | ............. 318/571 |
| 5,421,101 A | 6/1995 | Rank | ........................... 33/831 |
| 5,596,800 A | 1/1997 | Holliday et al. | ............... 29/751 |
| 5,734,113 A * | 3/1998 | Vogt et al. | ................ 73/862.23 |
| 6,212,924 B1 | 4/2001 | Meisser | ...................... 72/21.4 |
| 6,418,769 B1 | 7/2002 | Schreiner | .................... 72/21.4 |
| 6,505,494 B1 * | 1/2003 | Wollermann | ................ 73/1.15 |
| 2002/0164220 A1 | 11/2002 | Sailing | ....................... 409/131 |

* cited by examiner

*Primary Examiner*—Hezron Williams
*Assistant Examiner*—Nashmiya Fayyaz
(74) *Attorney, Agent, or Firm*—Baker & Hostetler LLP (57) ABSTRACT

To calibrate a tool evaluator having a first sensor, where this first sensor is operable to sense a force and transmit a first signal associated with the sensed force, a second sensor is disposed within the tool evaluator. This second sensor is operable to sense the force and transmit a second signal associated with the sensed force. In addition, the tool evaluator is controlled to apply the force to the second sensor and a calibration factor is determined in response to the first signal and the second signal.

27 Claims, 7 Drawing Sheets

TOOL EVALUATION CALIBRATOR AND METHOD

CROSS REFERENCE TO RELATED APPLICATIONS

This application claims priority to U.S. patent application Ser. No. 10/448,220, filed May 30, 2003, titled Tool Evaluation System and Method, the disclosure of which is incorporated herein by reference in its entirety.

FIELD OF THE INVENTION

The present invention generally relates to a calibrating device. More particularly, the present invention pertains to a tool evaluation calibrator and method of calibrating a tool evaluator.

BACKGROUND OF THE INVENTION

It is generally accepted that tools are utilized to facilitate a multitude of operations in various manufacturing and construction industries. Often, tools are configured to facilitate a particular task. Examples of such dedicated tools include wire strippers, pop riveters, cutters, and crimping tools. With regard to crimping tools, the term "crimping" generally refers to the production of a mechanical and/or electrical connection which remains essentially unchanged qualitatively over a long period of time. This connection is typically formed between a conductor, such as a wire, and a contact or fastener. During the crimping operation, the material to be connected is permanently plastically deformed. Poorly conducting surface layers, if present, are broken up, which promotes electrical conductivity. A correct crimping also prevents the ingress of corrosive media under operational conditions such as temperature change or vibration. Other terms which may be used to describe the crimping process include expressions such as, for example pressing, squeezing, fixing or attaching.

In relatively high technology industries, such as the aerospace industry, it is important that each tool perform its function with a sufficiently high degree of precision. In this regard, these tools often include a "lock-out" or other such safety mechanism configured to facilitate correct usage. For example, a known crimping tool or "crimper" includes a ratcheting mechanism having a pawl that clicks into a series of detents. Once a crimping operation has begun, the ratcheting mechanism substantially prevents removal of the wire and fastener until the pawl has advanced to the last detent. Unfortunately, if the crimper is worn or defective, the lock-out mechanism may not ensure a proper crimp and a connection having undesirable material and/or electrical properties may result.

Accordingly, it is desirable to provide a method and apparatus capable of overcoming the disadvantages described herein at least to some extent.

SUMMARY OF THE INVENTION

The foregoing needs are met, at least to a great extent, by the present invention, wherein in one respect an apparatus and method is provided that in some embodiments calibrates a tool evaluator.

An embodiment of the present invention pertains to a calibrator for calibrating a tool evaluator. The tool evaluator includes an actuator and a first sensor. The first sensor is operable to sense a force resulting from modulation of the actuator and transmit a first signal associated with the sensed force. The tool calibrator includes a second sensor and a controller. The second sensor is operable to sense the force and transmit a second signal associated with the sensed force. The controller is operably connected to the second sensor and the tool evaluator. The controller is configured to modulate the actuator and receive the first signal and the second signal. In this manner, the controller is configured to calibrate the first sensor in response to the first signal and the second signal.

Another embodiment of the present invention pertains to a tool evaluation calibration system. This system includes a tool evaluator and a calibrator. The tool evaluator is operable to evaluate a tool in response to movement of a member of the tool. This tool evaluator includes an actuator, a first controller and a first sensor. The actuator is configured to apply a force to the member. The first controller is operably connected to the actuator and configured to modulate the actuator. The first sensor is configured to sense a resistance to the force and transmit a signal associated with the sensed resistance to the controller. In addition, the first controller is configured to determine whether the sensed resistance is relatively greater than a predetermined threshold value. The calibrator includes a second sensor and a second controller. The second sensor is operable to sense force exerted by the actuator and transmit signals associated with the sensed force. The second controller is operably connected to the second sensor and the tool evaluator. The second controller is configured to modulate the actuator and receive signals from the second sensor and the first sensor. In this manner, second controller is configured to calibrate the first sensor in response to the signals received from the second sensor and the first sensor.

Yet another embodiment of the present invention relates to an apparatus for calibrating a tool evaluator having a first sensor. This first sensor is operable to sense a force and transmit a first signal associated with the sensed force. The apparatus includes a means for disposing a second sensor within the tool evaluator. This second sensor is operable to sense the force and transmit a second signal associated with the sensed force. The apparatus further includes a means for controlling the tool evaluator to apply the force to the second sensor and a means for determining a calibration factor in response to the first signal and the second signal.

Yet another embodiment of the present invention relates to a method of calibrating a tool evaluator having a first sensor. This first sensor is operable to sense a force and transmit a first signal associated with the sensed force. In the method, a second sensor is disposed within the tool evaluator. This second sensor is operable to sense the force and transmit a second signal associated with the sensed force. In addition, the tool evaluator is controlled to apply the force to the second sensor and a calibration factor is determined in response to the first signal and the second signal.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION OF THE PREFERRED EMBODIMENT

The present invention provides a calibration device and method for calibrating a tool evaluation device. In some embodiments, the invention provides for a calibrator of a tool evaluator. This tool evaluator is configured to evaluate a tool in response to movement of a member of the tool. For example, tools often include one or more handles (members). This tool evaluator includes an actuator configured to apply a force to the member. In general, an actuator is a mechanical device for moving or exerting force. The tool evaluator further includes a controller to control movement of the actuator or modulate the actuator. Moreover, the tool evaluator includes a sensor, such as a load sensor, configured to sense a resistance to the force and transmit a force measurement to the controller. These force measurements may be in the form of signals transmitted via a medium such as a wire, or via a wireless manner. In addition, the controller is configured to determine whether the force measurement is relatively greater than a predetermined threshold value. This threshold value typically indicates that the tool is performing within acceptable parameters. The threshold value may be empirically determined or provided by the tool's manufacturer. To facilitate accurate measurement of force, this tool evaluator may be calibrated utilizing a reference load cell. Examples of suitable reference load cells include at least those traceable to the National Institute of Standards and Technology (NIST).

In another embodiment, the invention provides a method of calibrating a tool evaluator having a first sensor utilizing the reference load cell. In this method, the reference load cell is disposed within the tool evaluator and the tool evaluator is controlled to apply a force to the first sensor and the reference load cell. The force is sensed by the reference load cell and the first sensor. A first measurement is generated by the first sensor in response to the sensed force and a second measurement is generated by the reference load cell in response to the sensed force. In addition, a calibration factor is determined in response to the first measurement and the second measurement. In at least one embodiment of the invention, the response of the sensor is essentially linear within the range of loads tested. That is, when subjected to a plurality of different loads, the response of the sensor is essentially proportional to the load. Thus, this calibration factor may be described in terms of a slope and y-intercept on a plot of load (in kilograms) verses response (in milivolts of output).

Advantages of various embodiments of the invention include, for example: (1) calibrating a tool evaluator to facilitate proper function; (2) determining whether the tool evaluator is defective; and (3) maintaining a log of the tool evaluator performance.

Figure 1:
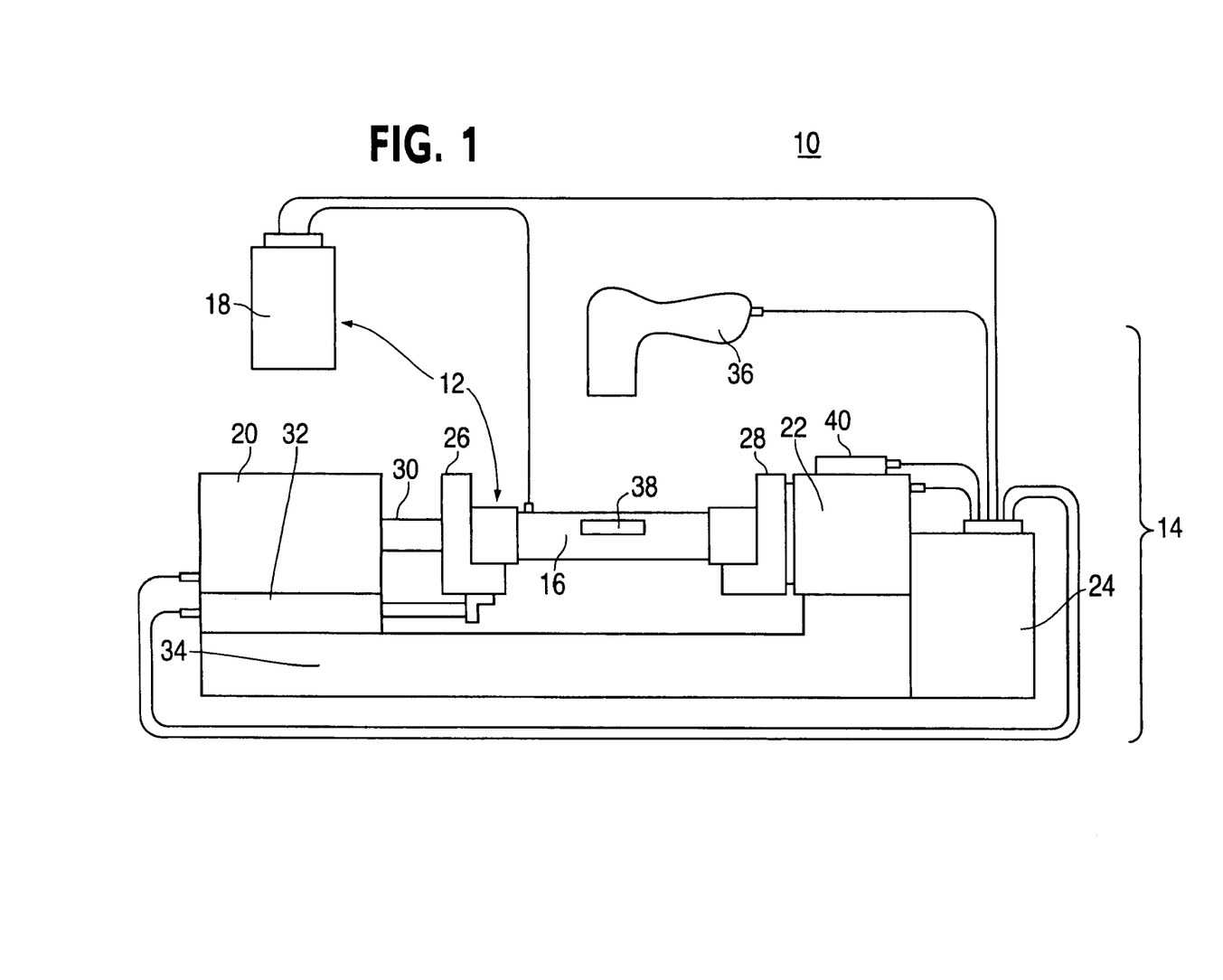
FIG. 1 is an illustration of a system for calibrating a tool evaluating device according to an embodiment of the invention.

An embodiment of the invention will now be described with reference to the drawing figures, in which like reference numerals refer to like parts throughout. As shown in FIG. 1, a calibration system 10 includes a calibration device (calibrator) 12 and a tool evaluating device (evaluator) 14. The calibrator 12 includes a reference load cell 16 and a calibration controller 18. The reference load cell 16 is configured to sense force exerted upon it and transmit measurements associated with the sensed force. The term, "measurement" is defined herein as a relative and/or absolute value associated with the process of sensing, measuring, detecting, and the like. In various embodiments of the invention, the reference load cell 16 may include any suitable load or force measuring device. For example, the reference load cell 16 may include one or more strain gauges, pressure and/or torque transducers, and/or the like. The calibration controller 18 is configured to receive measurements from the reference load cell 16. The calibration controller 18 is further configured to control the evaluator 14 and receive transmitted signals therefrom.

The evaluator 14 is operable to test a tool disposed between an actuator 20 and a load sensor 22. However, for the purpose of calibrating the evaluator 14, the tool is replaced by the reference load sensor 16 disposed between the actuator 20 and the load sensor 22. In various embodiments of the invention, the actuator 20 may include, for example, a pneumatic piston driven ram, electromagnetic ram, electric servomotor, or the like. To modulate or control the actuator 20, the evaluator 14 includes an evaluation controller 24. The load sensor 22 may include various load or pressure sensing devices, such as a load cell, pressure transducer, or the like. In this regard, the load sensor 22 is configured to sense changes in force or pressure and relay this information to the evaluation controller 24.

The evaluator 14 further includes a plurality of rests 26 and 28. The rest 26 is attached to a shaft 30 of the actuator 20 and configured to provide a surface to bear against an end of the reference load cell 16. The rest 28 is configured to provide a bearing surface on to which another end of the reference load cell 16 may thrust against. The rest 28 is connected to the load sensor 22 and further configured to convey the thrust to the load sensor 22.

In addition, the evaluator 14 may include a position sensor 32 configured to sense the position and/or linear travel of the rest 26 and relay this positional information to the evaluation controller 24. For example, the position sensor 32 may include a linear potentiometer. However, in another embodiment of the invention, the attributes of the position sensor 32 and actuator 20 may be subsumed within a single device. For example, an electric servomotor generally includes actuating and position sensing capabilities.

The evaluator 14 further includes a base 34 operable to provide a substantially rigid platform on to which the various other components of the evaluator 14 are mounted.

The evaluator 14 may, optionally, include a scanning device (scanner) 36 configured to sense an identification mark and/or device ("ID") 38 of the reference load cell 16. This ID 38, if present, may be in the form of a Universal Product Code (UPC)/European Article Number (EAN) bar code, a radio frequency (RF) tag, or the like. Accordingly, depending upon the specific form of the ID 38, the scanner 36 may be configured to sense the various ID forms. Moreover, while typically not utilized during calibration, depending upon the tool to be tested, the evaluator 14 may include a click sensor 40 operable to sense "clicks" emitted by and/or through the tool. For example, vibration through the tool and/or a pressure wave generated by vibration of the tool may be sensed by an accelerometer, a microphone, and/or the like. The click sensor 40 is configured to relay the auditory and/or vibrational measurements to the evaluation controller 24.

In operation, the calibration system 10 is configured to exert a force upon the reference load cell 16 and sense this force with both the reference load cell 16 and the load sensor 22. Respective measurements from these sensors are compared and the measurement response of the load sensor 22 is calibrated according to the reference load sensor 16.

It is to be noted that the conformation of the various elements of the calibration system 10 is not critical and may be altered to suit the particular tool being tested. For example, the load sensor 22 need not be disposed to be thrust upon by the reference load cell 16, but rather, the load sensor 22 may be located in any suitable position operable to sense force exerted upon the reference load cell 16. In this regard, specific examples of alternative arrangements include the load sensor 22 being disposed between the actuator 20 and the reference load cell 16 and/or between the actuator 20 and the base 34. However, other arrangement may be suitable, again, depending upon the particular tool being tested. Similarly, the arrangement of other elements of the evaluator 14, such as the click sensor 40 and the position sensor 32 may be altered in any suitable manner.

Figure 2:
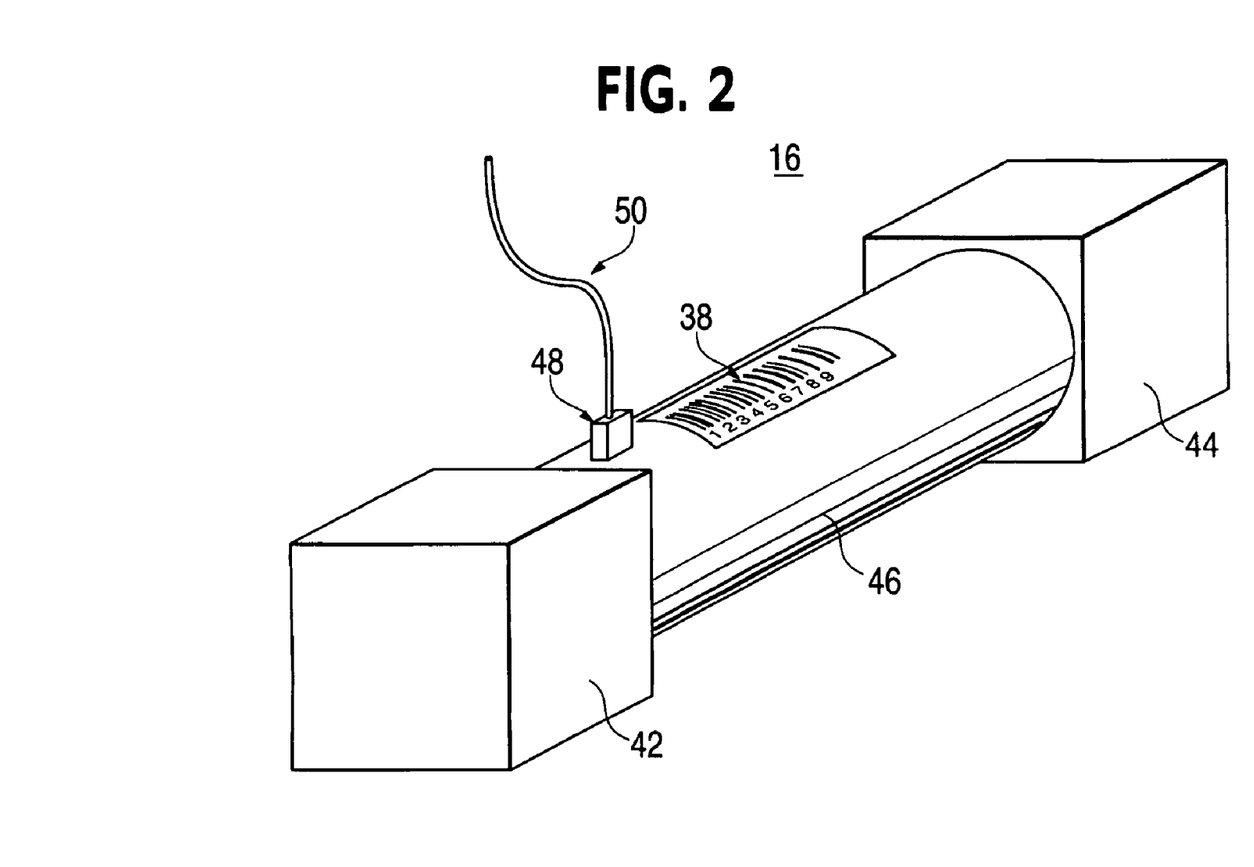
FIG. 2 is an illustration of a reference load cell suitable for use in the system according to FIG. 1.

FIG. 2 is an illustration of the reference load cell 16 according to an embodiment of the invention and suitable for use in the calibration system 10 illustrated in FIG. 1. As shown in FIG. 2, the reference load cell 16 includes a plurality of adapters 42 and 44 disposed on either end of a load cell 46. These adapters 42 and 44 are configured to facilitate positioning the reference load cell 16 within the evaluator 14 in a manner such that the rests 26 and 28 are operable to exert force upon the reference load cell 16. For example, as illustrated, the load cell 46 is substantially cylindrical in shape and may tend to roll without adequate support. In this regard, the adapters 42 and 44 are substantially box shaped and thus, provide several essentially flat bearing surfaces on to which the reference load cell 16 may rest and have force applied. In addition, the adapters 42 and 44 are configured so as to provide minimal interference in the operation of the load cell 46. For example, the adapters 42 and 44 may each include a recess having an inside diameter slightly larger than the outside diameter of the load cell 46 and surfaced to provide a suitably low friction, sliding interface between the adapters 42 and 44 and the load cell 46. It is to be noted that the conformation of the various parts of the reference load cell 16 need not be as mentioned, but rather, may include any suitable conformation. Furthermore, given a load cell of an appropriate conformation, it is within the scope of the invention that the function of the adapters 42 and 44 be subsumed within the load cell 46.

The reference load cell 16 further includes a connector 48 configured to connect a power/data line 50 to the reference load cell 16. This power/data line 50 is configured to provide power to the various components of the reference load cell 16 and serve as a medium via which signals associated with force measurements may be transmitted from the reference load cell 16 to the calibration controller 18. However, it is within the scope of various embodiments of the invention that the reference load cell 16 include an independent power source such as a battery and/or communicate with the calibration controller 18 via a wireless connection.

Figure 3:
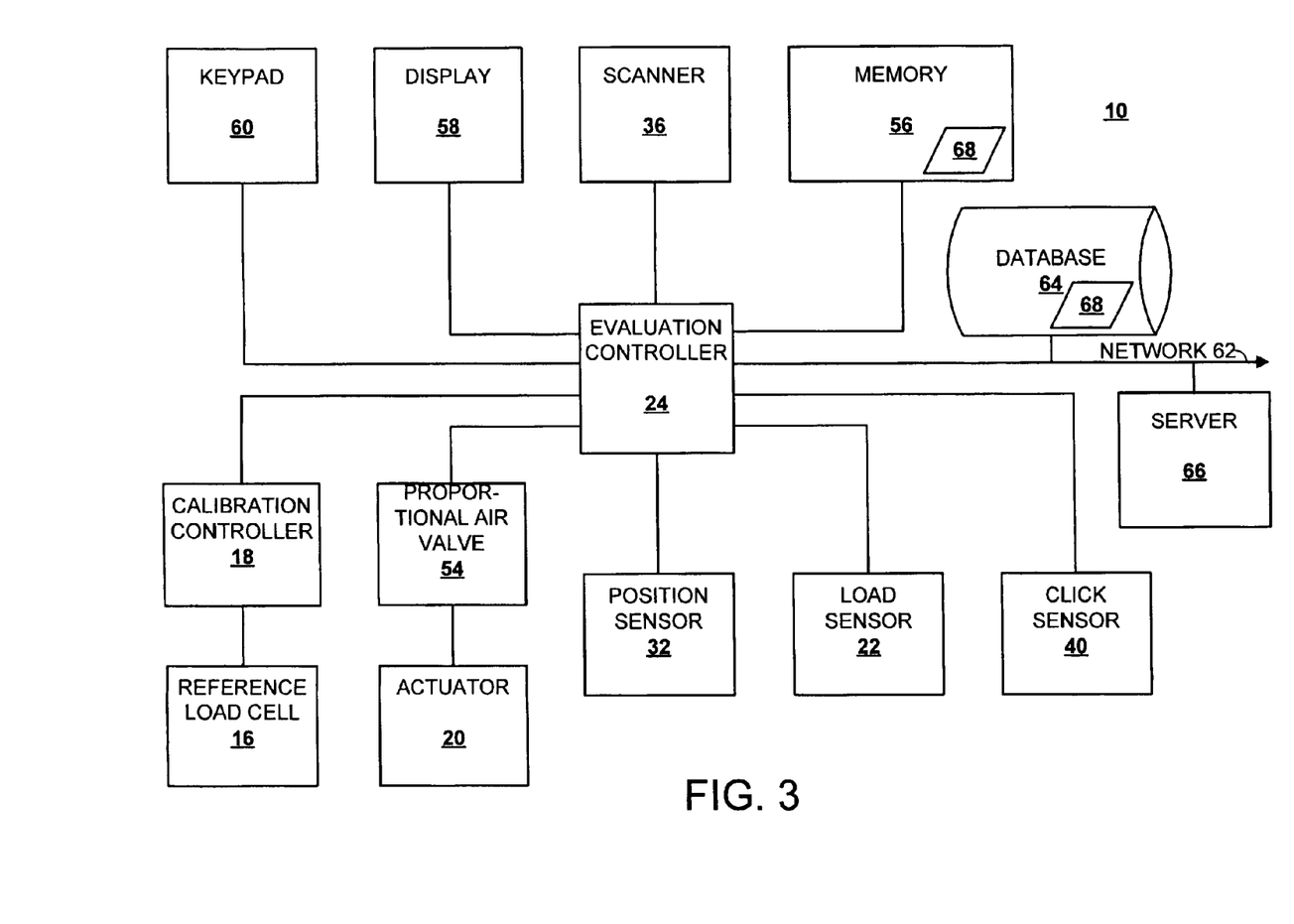
FIG. 3 is a block diagram of the system according to FIG. 1.

FIG. 3 is a system architecture for the calibration system 10 according to an embodiment of the invention. As shown in FIG. 3, the evaluation controller 24 is configured to modulate the actuator 20 via a proportional air valve (PAV) 54. The PAV 54 is configured to modulate the delivery of air to the actuator 20. For example, in response to a given voltage of electricity being supplied to the PAV 54, the PAV 54 may supply a specific air pressure to the actuator 20.

The evaluation controller 24 is further configured to intercommunicate with the load sensor 22, position sensor 32, click sensor 40, and the scanner 36. In addition, the evaluation controller 24 is configured to intercommunicate with a memory 56, a display 58, and a keypad 60. The memory 56 is configured to store data received from the evaluation controller 24. For example, the memory 56 may store tool IDs, sensor readings, dates, response profile of the load sensor 22, and the like. With regard to the response profile of the load sensor 22, in an embodiment of the invention, the load sensor 22 responds in an essentially linear manner to force exerted upon it. For example, the electrical resistance of the load sensor 22 may be altered as a function of the load placed upon the load sensor 22. While it is not a requirement, it is preferable that the function is a line that may be described by a slope and y-intercept. The display 58 is configured to provide visual information to a user. In another form, the display 58 may include a touch screen configured to provide a data entry capacity to the user. In this regard, the display 58 and/or the keypad 60 is configured to provide the user with the capability to select a calibration mode. The keypad 60 may, optionally, be included in the calibration system 10. If present, the keypad 60 is configured to provide a data entry capacity to the user.

Furthermore, in various embodiments of the invention, the calibration system 10 may include a network 62 configured to intercommunicate with the evaluation controller 24. The network 62 may include, for example, a database 64, server 66, and a multitude of other networked devices. In this regard, the network 62 may include a local area network (LAN), wide area network (WAN), wireless network, the Internet, and the like.

Moreover, the calibration system 10 may include at least one table 68. This table 68 may be stored to the memory 56 and/or the database 64. The table 68 may be configured to store data relating to testing of one or more tools. In addition, the table 68 may include data related to calibration of the evaluator 14. For example, data stored to the table 68 may include the ID 38, time stamp information, date of last calibration, and the like. This data may be stored to the table 68 in the form of one or more entries, for example. These entries may be configured to associate and store various measurements sensed at a particular increment of the testing procedure described in FIG. 5. For example, each measurement sensed may include an associated timestamp. In this manner, as the evaluator 14 may be subjected to a plurality of calibrations, such as the calibration described herein, measurements collected during these tests may be retained in the table 68. In this manner, the performance of the evaluator 14 over time, may be evaluated and a performance trend may be extrapolated. This performance trend may be utilized to facilitate maintenance or retirement of the evaluator 14 prior to failure. Furthermore, if it is determined that the evaluator 14 is out of calibration or otherwise faulty, the table 68 may be accessed to determine the identity of any recently tested tools. In this manner, the identified tools may be retested following calibration or repair of the evaluator.

To perform the calibration, the calibration system 10 includes the calibration controller 18 and the reference load cell 16. The calibration controller 18 is configured to intercommunicate with the evaluation controller 24 and thereby control the various components of the evaluator 14. Specifically, the calibration controller 18 is configured to control the PAV 54 via the evaluation controller 24. In this manner, the calibration controller 18 may modulate the actuator 20. The calibration controller 18 is further configured to intercommunicate with the reference load cell 16 via the power/data line 50.

Figure 4:
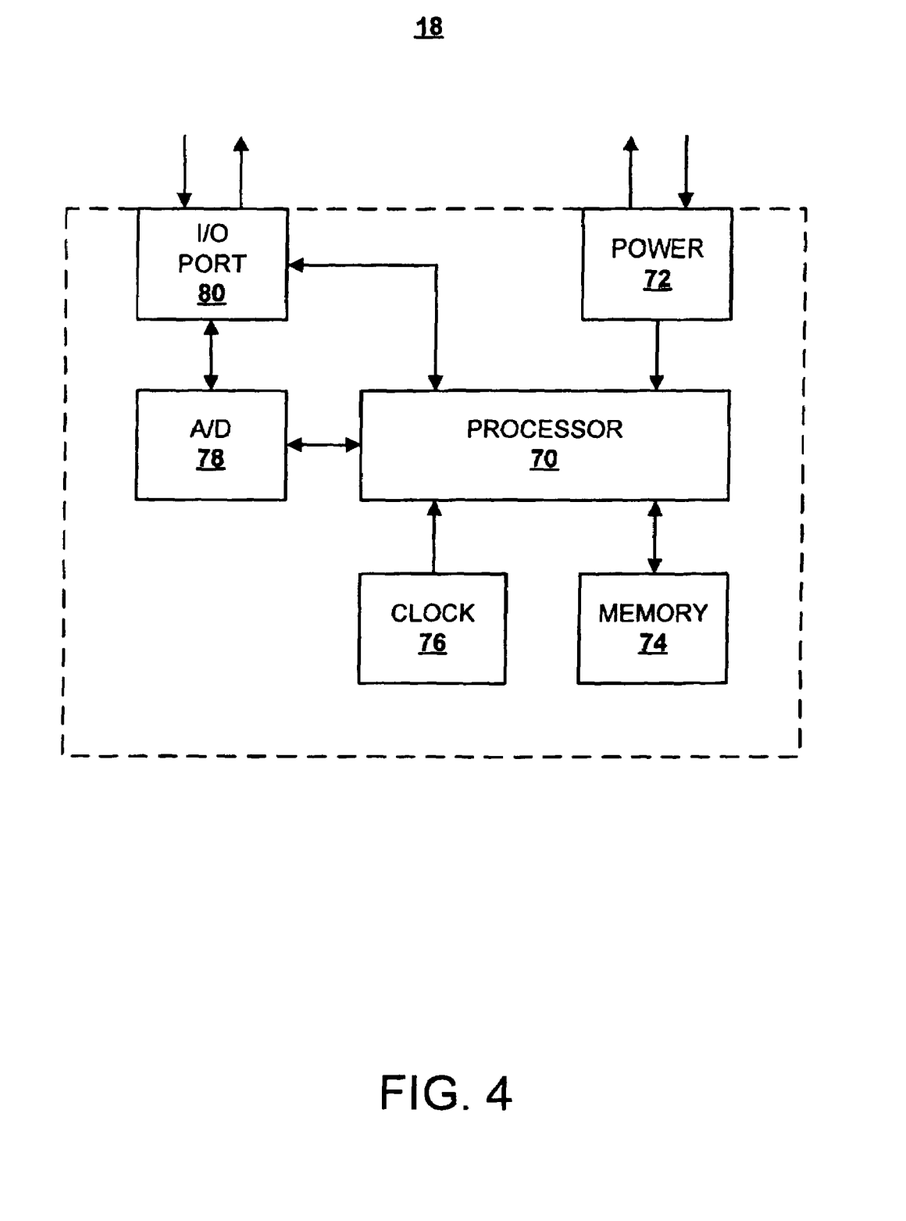
FIG. 4 is a system architecture for a controller suitable for use in the system according to FIG. 1.

FIG. 4 is a system architecture for the calibration controller 18 suitable for use in the calibration system 10 according to FIG. 1. As shown in FIG. 4, the calibration controller 18 includes a processor 70. This processor 70 is operably connected to a power supply 72, memory 74, clock 76, analog to digital converter (A/D) 78, and an input/output (I/O) port 80. The I/O port 80 is configured to receive signals from any suitably attached electronic device and forward these signals to the A/D 78 and/or the processor 70. For example, the I/O port 80 may receive signals associated with load sensed by the reference load cell 16 and/or the load sensor 22 and forward the signals to the processor 70. If the signals are in analog format, the signals may proceed via the A/D 78. In this regard, the A/D 78 is configured to receive analog format signals and convert these signals into corresponding digital format signals. Conversely, the A/D 78 is configured to receive digital format signals from the processor 70, convert these signals to analog format, and forward the analog signals to the I/O port 80. In this manner, electronic devices configured to receive analog signals may intercommunicate with the processor 70.

The processor 70 is configured to receive and transmit signals to and from the A/D 78 and/or the I/O port 80. The processor 70 is further configured to receive time signals from the clock 76. In addition, the processor 70 is configured to store and retrieve electronic data to and from the memory 74. Furthermore, the processor 70 is configured to determine signals operable to modulate the PAV 54 and thereby control the actuator 20 to exert a particular force. For example, signals associated with the pounds per square inch (psi) of gas supplied to the actuator 20 may be forwarded to the PAV 54 by the processor 70 via the I/O port 80 and the evaluation controller 24.

According to an embodiment of the invention, the processor 70 is configured to determine a slope and y-intercept for the load sensor 22 based on the response of the load sensor 22 and the reference load cell 16 to the force applied by the actuator 20. For example, the processor 70 may control the actuator 20 to exert a plurality of different loads. Measurements associated with these different loads may be received by the processor 70 and utilized to determine a slope and y-intercept. In this manner, the response of the load sensor 22 may be configured to essentially match the response of the reference load cell 16.

According to another embodiment of the invention, the processor 70 is configured to determine whether the load sensor 22 is defective based on the response of the load sensor 22 and the reference load cell 16 to the force applied by the actuator 20. For example, if the processor 70 determines that the response of the load sensor 22 is not essentially linear or is otherwise not able to essentially match the reference load cell 16, the processor 70 may determine that the load sensor 22 is defective.

However, it is to be understood that the functions of processor 70 and the calibration controller 18 may be subsumed within the evaluation controller 24. For example, it is within the scope of various embodiments of the invention that the reference load cell 16 may be configured to intercommunicate with the evaluation controller 24. Furthermore, in these various embodiments of the invention, the evaluation controller 24 may be configured to modulate the actuator 20 to vary the load upon the reference load cell 16 in a manner similar to that ascribed to the calibration controller 18 and described herein.

Figure 5:
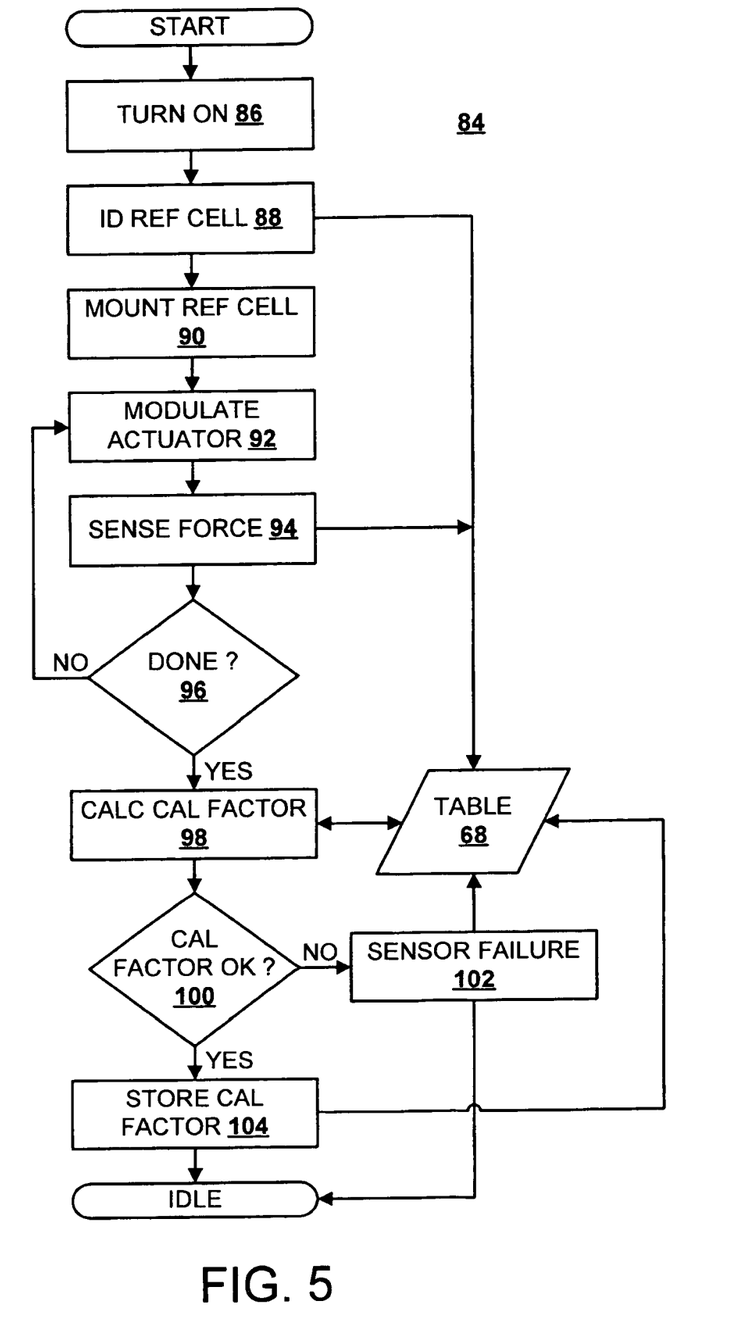
FIG. 5 is a flow diagram according to an embodiment of the invention.

FIG. 5 is a flow diagram of a method 84 according to an embodiment of the invention. As shown in FIG. 5, the method 84 is initiated in response to turning on the calibration system 10 at step 86. At steps 88 and 90, the reference load cell 16 is identified and mounted in the evaluator 14. For example, the ID 38 may be sensed by the scanner 36. In addition, the reading for the ID 38 may be utilized to retrieve data associated with the reference load cell 16. For example, the slope and y-intercept corresponding to the response of the reference load cell 16 may be incorporated into the ID 38. This slope and y-intercept may be stored to the memory 74 and utilized by the processor 70 to convert voltage measurements forwarded by the reference load cell 16 into load measurements. Furthermore, the reading for the ID 38 may be utilized to retrieve data associated with the reference load cell 16 from the table 68 and/or the database 64. In this manner, any calibration history for the reference load cell 16 may be retrieved and compared to data ascertained while performing the method 84. In addition, if the table 68 has not yet been created for the calibration system 10 and/or the reference load cell 16, at step 88, the table 68 may be generated. Furthermore, the table 68 may be stored to the memory 56, the memory 74 and/or the database 64 at step 88.

At steps 92 to 96, the actuator 20 is modulated and force resulting from this modulation is sensed by the load sensor 22 and the reference load cell 16. According to an embodiment of the invention, the modulation is performed at a plurality of different intensities. For example, the PAV 54 may be controlled to deliver gas to the actuator 20 at 5 discrete values. These discrete values may correspond to a reasonable range of loads that may be expected to be experienced during evaluation of a tool. For example, if loads typically experience during tool evaluation fall within a range of 10 to 20 kilograms (kg), then the discrete values may correspond to loads that bracket this range. Accordingly, the response of the load sensor 22 may be calibrated in a manner substantially similar to that experienced in actual tool evaluation.

In a more specific example of steps 92 to 96, at step 92, the actuator 20 may be modulated to initially exert approximately 6 kg of force. In subsequent iterations of the step 92, the actuator 20 may be modulated to exert 6 kg more force at each iteration. At step 94, the load sensor 22 and the reference load cell 16 may sense the force exerted and measurements associated with the force exerted may be stored to the table 68 for each of the load sensor 22 and the reference load cell 16. At step 96, it may be determined if the modulation of the actuator 20 is complete. For example, if the force exerted by the actuator 20 is approximately 30 kg or the step 92 has been performed 5 time, it may be determined that the modulation of the actuator is complete and a calibration factor may be calculated at step 98. If it is determined that the modulation of the actuator is not complete, the actuator 20 may be further modulated at step 92. Thus, for example, if 5 iterations of step 92 are performed during the method 84, the actuator 20 may be controlled to exert 6, 12, 18, 24, and 30 kg at the 5 respective iterations.

Figure 6:
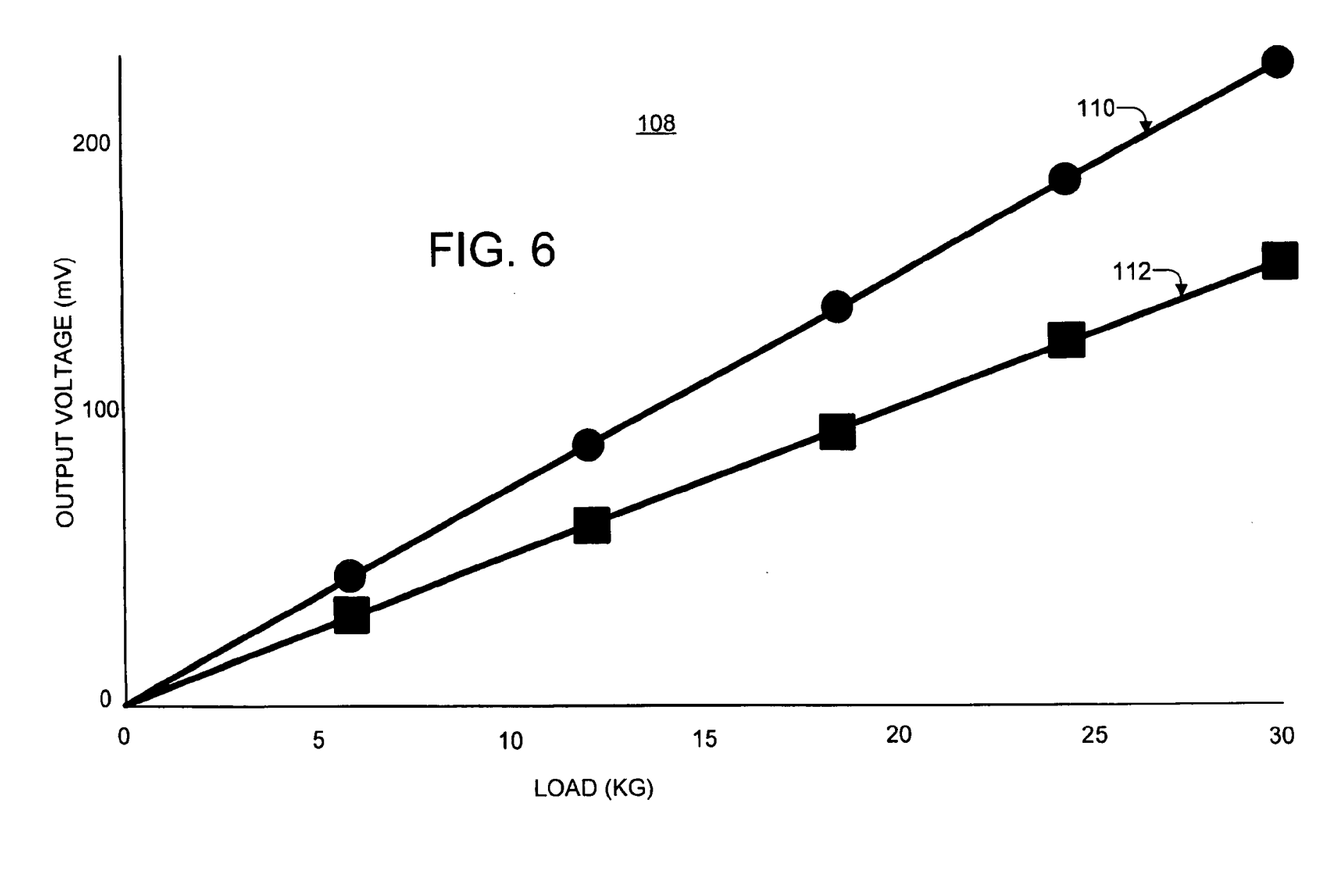
FIG. 6 is an example of a graph according to an embodiment of the invention.

At step 98, the data from the table 68 is utilized to determine a calibration factor for the actuator 20. For example, the measurements associated with the 5 discrete loads sensed by the load sensor 22 may be compared to the corresponding measurements sensed by the reference load cell 16. An example of this comparison is illustrated in FIG. 6. This calibration factor may be stored to the memory 74 and evaluated at step 100.

At step 100, the calibration factor determined at step 98 is evaluated. For example, if the processor 70 determines that the response of the load sensor 22 is non-linear or the slope, and/or the y-intercept of the response of the load sensor 22 is outside a predetermined range, the processor 70 may determine that the calibration factor is not acceptable. If the calibration factor is determined to be unacceptable, an error message may be generated and the date of the failure may be stored to the table 68 at step 102. If it is determined that the calibration factor is acceptable, the calibration factor may be stored to the table 58 and utilized by the evaluator 14 when evaluating a tool.

Following the steps 102 or 104, the calibrator 18 may idle. According to various embodiments of the invention, the evaluator 14 may prompt the user to initiate the method 84 at a set recalibration interval. That is, the calibration factor may be valid for a predetermined length of time and/or predetermined number of tool evaluations. The predetermined length of time and number of evaluation may be based on a variety of factors such as accuracy of load sensor 22, drift of load sensor 22, empirical data, manufacturers specifications, and the like.

It is to be noted that the steps for the method 84 need not proceed in the order presented, but rather, may proceed in any suitable order. For example, steps 88 and 90 may proceed in reverse order or simultaneously.

FIG. 6 is an example of a graph 108 of load in kg verses output voltage in milivolts (mV) for the load sensor 22 and the reference load cell 16. As shown in FIG. 6, a line 110 includes a plurality of circular data nodes representing the response in mV of the reference load cell 16 to a plurality of discrete loads. Similarly, a line 112 includes a plurality of square data nodes representing the response in mV of the load sensor 22 to the plurality of discrete loads. The load value for each of the data nodes in the line 112 is based upon the load values as measured by the reference load cell 16. As shown in FIG. 6, the slope of the lines 110 and 112 differ somewhat, although the respective y-intercepts are both approximately equal to 0. However, the graph 108 is for illustrative purposes only, and thus, the respective slopes and y-intercepts may be the same or different depending on the response of the various components.

Figure 7:
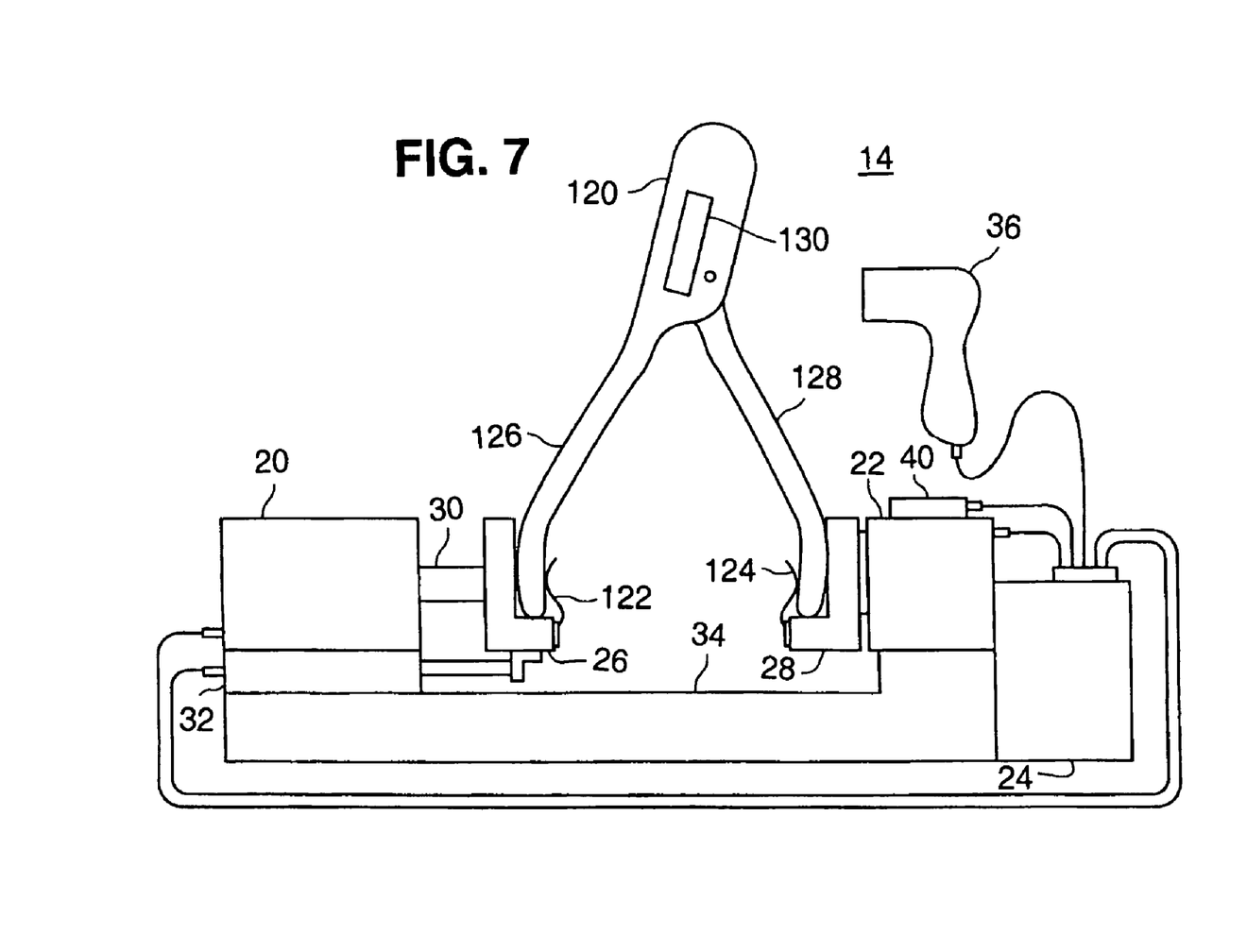
FIG. 7 is a tool evaluating device according to an embodiment of the invention.

As shown in FIG. 7, the tool evaluating device 14 ("evaluator") is configured to test a tool 120 disposed between the actuator 20 and the load sensor 22. In various embodiments of the invention, the actuator 20 may include, for example, a pneumatic piston driven ram, electro-magnetic ram, electric servomotor, or the like. To modulate or control the actuator 20, the evaluator 14 includes the controller 24. The load sensor 22 may include various load or pressure sensing devices, such as a load cell, pressure transducer, or the like. In this regard, the load sensor 22 is configured to sense changes in force or pressure and relay this information to the controller 24.

Optionally, the tool 120 may be held in place by at least one clip, such as clips 122 and 124. If present, these clips 122 and 124 are preferably attached to the plurality of respective rests 26 and 28. The rest 26 is attached to the shaft 30 of the actuator 20 and configured to provide a surface to bear against a member 126 of the tool 120. The rest 28 is configured to provide a bearing surface on to which a member 128 of the tool 120 may thrust against. The rest 28 is connected to the load sensor 22 and further configured to convey the thrust to the load sensor 22.

In addition, the evaluator 14 may include the position sensor 32 configured to sense the position and/or linear travel of the rest 26 and relay this positional information to the controller 24. For example, the position sensor 32 may include a linear potentiometer. However, in another embodiment of the invention, the attributes of the position sensor 32 and actuator 20 may be subsumed within a single device. For example, an electric servomotor generally includes actuating and position sensing capabilities.

The evaluator 14 further includes a base 34 operable to provide a substantially rigid platform on to which the various other components of the evaluator 14 are mounted.

Depending upon the tool 120 to be tested, the evaluator 14 may include the click sensor 40 operable to sense "clicks" emitted by and/or through the tool 120. For example, vibration through the tool 120 and/or a pressure wave generated by vibration of the tool 120 may be sensed by an accelerometer, a microphone, and/or the like. The click sensor 40 is configured to relay the auditory and/or vibrational measurements to the controller 24. Moreover, the evaluator 14 may, optionally, include the scanning device (scanner) 36 configured to sense an identification mark and/or device ("ID") 130 of the tool 120. This ID 130, if present, may be in the form of a Universal Product Code (UPC)/European Article Number (EAN) bar code, a radio frequency (RF) tag, or the like. Accordingly, depending upon the tool 120 to be tested, the scanner 36 may be configured to sense the various ID forms.

In operation, the evaluator 14 is configured to test the tool 120 by modulating the tool 120 in a manner substantially similar to that experienced in actual use. For example, a hand tool may be configured to perform a function as a result of two handles being moved from an open to a closed position. Accordingly, to test this hand tool, the two handles may be driven one towards the other. However, depending upon manufactures specifications, the tool 120 may or may not actually perform its function during the test. That is, in the specific example of a crimper, depending upon the manufacturers specification regarding the crimper, a crimped connection between a wire and a connector may or may not be performed in order to test the tool.

It is to be noted that the conformation of the various elements of the evaluator 14 is not critical and may be altered to suit the particular tool being tested. For example, the load sensor 22 need not be disposed to be thrust upon by the member 128, but rather, the load sensor 22 may be located in any suitable position operable to sense resistance of the tool 120 to pressure applied by the actuator 20. In this regard, specific examples of alternative arrangements include the load sensor 22 being disposed between the actuator 20 and the member 126 and/or between the actuator 20 and the base 34. However, other arrangement may be suitable, again, depending upon the particular tool being tested. Similarly, the arrangement of other elements of the evaluator 14, such as the click sensor 40 and the position sensor 32 may be altered in any suitable manner.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A system comprising:
a tool evaluator, the tool evaluator being configured to evaluate a hand-operable tool, the tool having a first handle movable relative to a second handle, the tool evaluator having an actuator and a first sensor, the first sensor being operable to sense a force resulting from modulation of the actuator and transmit a first signal associated with the sensed force, the tool evaluator comprising:
a first rest attached to the actuator, the first rest being configured to bear against the first handle during tool evaluation;
a second rest in cooperative alignment with the first rest, the second rest being configured to bear against the second handle; and
a controller configured to control the tool evaluator; and
a calibrator for calibrating the tool evaluator comprising:
a second sensor configured to sense the force and transmit a second signal associated with the sensed force, the second sensor having a first end and a second end, wherein during calibration of the tool evaluator, the first end is configured to bear against the first rest, the second end is configured to bear against the second rest, and the second sensor is operably connected to the controller, the controller being configured to modulate the actuator and receive the first signal and the second signal, wherein the controller is configured to calibrate the first sensor in response to the first signal and the second signal.

2. The system according to claim 1, wherein the controller is configured to modulate the actuator to exert a plurality of different loads upon the first sensor and the second sensor.

3. The system according to claim 2, further comprising a proportional air valve configured to supply pressurized air to the actuator, wherein the pressure of the air is regulated in response to modulations by the controller.

4. The system according to claim 2, wherein the first sensor is configured to sense the plurality of different loads and transmit a first set of signals to the controller and the second sensor is configured to sense the plurality of different loads and transmit a second set of signals to the controller.

5. The system according to claim 4, wherein the controller is further configured to correlate each load of the plurality of different loads to a respective signal of the first set of signals and the second set of signals and the controller being further configured to determine a response profile of the first sensor to the plurality of different loads in response to the correlation.

6. The system according to claim 5, wherein the controller is further configured to determine whether the response profile is within a predetermined range of values.

7. A tool evaluation calibration system comprising:
a tool evaluator for evaluating a hand-operable tool in response to movement of a first handle member of the hand-operable tool relative to a second handle member of the hand-operable tool, the tool evaluator comprising:
a first rest to provide a first surface to bear against the first handle member of the hand-operable tool during tool evaluation;
a second rest to provide a second surface to bear against the second handle member of the hand-operable tool;
an actuator attached to the first rest and configured to apply a force to the first rest;
a first controller operably connected to the actuator and configured to modulate the actuator; and
a first sensor configured to sense a resistance to the force and transmit a signal associated with the sensed resistance to the controller, wherein the first controller is configured to determine whether the sensed resistance is relatively greater than a predetermined threshold value; and
a calibrator comprising:
a second sensor operable to sense force exerted by the actuator and transmit signals associated with the sensed force, wherein the second sensor includes a first end and a second end, wherein during calibration the first end being configured to be borne upon by the first surface and the second end being configured to be borne upon by the second surface; and
a second controller operably connected to the second sensor and the tool evaluator, the second controller configured to modulate the actuator and receive signals from the second sensor and the first sensor, wherein the second controller is configured to calibrate the first sensor in response to the signals received from the second sensor and the first sensor.

8. The system according to claim 7, wherein the first controller is configured to display a recalibration warning following a predetermined recalibration increment.

9. The system according to claim 7, further comprising a proportional air valve configured to supply pressurized air to the actuator, wherein the pressure of the air is regulated in response to modulations of the proportional air valve.

10. The system according to claim 7, wherein the first controller and the second controller comprise a system controller configured to control the tool evaluation calibration system.

11. The system according to claim 7, wherein the second controller is further configured to correlate each load of a plurality of different loads exerted by the actuator to respective signals from the first sensor and the second sensor and the second controller being further configured to determine a response profile of the first sensor to the plurality of different loads.

12. The system according to claim 11, further comprising a memory, wherein the response profile of the first sensor is stored to the memory in response to the second controller determining the response profile is within a predetermined range of values.

13. An apparatus for calibrating a tool evaluator configured to evaluate a hand-operable tool in response to a first handle of the hand-operable tool being moved relative to a second handle of the hand-operable tool and the tool evaluator having a first sensor, the first sensor being operable to sense a force and transmit a first signal associated with the sensed force, the apparatus comprising:

means for disposing a second sensor within the tool evaluator, the second sensor being operable to sense the force and transmit a second signal associated with the sensed force;

means for bearing, the means for bearing being configured to bear against the second sensor during calibration of the tool evaluator and the means for bearing being configured to bear against the first and second handles of the hand-operable tool during evaluation of the hand-operable tool;

means for controlling the tool evaluator to apply the force to the second sensor; and means for determining a calibration factor in response to the first signal and the second signal.

14. The apparatus according to claim 13, further comprising means for controlling the tool evaluator to apply a plurality of different forces to the first sensor and the second sensor, wherein the first sensor is configured to sense the plurality of different forces and transmit a first set of signals associated with the plurality of different forces, the second sensor being configured to sense the plurality of different forces and transmit a second set of signals associated with the plurality of different forces.

15. The apparatus according to claim 14, further comprising means for determining a response profile of the first sensor in response to the first set of signals and the second set of signals.

16. The apparatus according the claim 15, further comprising means for determining if the response profile is within a predetermined range of values.

17. The apparatus according to claim 13, further comprising means for storing the calibration factor to a table.

18. The apparatus according to claim 17, further comprising means for sensing an identity of the second sensor.

19. The apparatus according to claim 17, further comprising means for extrapolating a performance trend of the tool evaluator in response to the table.

20. A method of calibrating a tool evaluator, the tool evaluator being configured to evaluate a hand-operable tool in response to a first handle of the hand-operable tool being moved relative to a second handle of the hand-operable tool and the tool evaluator having a first sensor, the first sensor being operable to sense a force and transmit a first signal associated with the sensed force, the method comprising:

disposing a second sensor between a pair of rests of the tool evaluator, the pair of rests providing respective surfaces to bear against the second sensor to facilitate calibrating the tool evaluator and the respective surfaces being configured to bear against the first handle and the second handle of the hand-operable tool to facilitate evaluating the hand-operable tool, the second sensor being operable to sense the force and transmit a second signal associated with the sensed force;

controlling the tool evaluator to apply the force to the second sensor; and determining a calibration factor in response to the first signal and the second signal.

21. The method according to claim 20, further comprising controlling the tool evaluator to apply a plurality of different forces to the first sensor and the second sensor, wherein the first sensor is configured to sense the plurality of different forces and transmit a first set of signals associated with the plurality of different forces, the second sensor being configured to sense the plurality of different forces and transmit a second set of signals associated with the plurality of different forces.

22. The method according to claim 21, further comprising determining a response profile of the first sensor in response to the first set of signals and the second set of signals.

23. The method according the claim 22, further comprising determining if the response profile is within a predetermined range of values.

24. The method according to claim 23, wherein in response to the response profile being within the predetermined range of values, the calibration factor is determined to be the slope and y-intercept of the response profile.

25. The method according to claim 20, further comprising storing the calibration factor to a table.

26. The method according to claim 25, further comprising sensing an identity of the second sensor.

27. The method according to claim 25, further comprising extrapolating a performance trend of the tool evaluator in response to the table.

* * * * *